United States Patent (10) Patent No.: US 8,572,334 B2
Scott et al. (45) Date of Patent: Oct. 29, 2013

(54) SYSTEM AND METHOD FOR LOCKING PORTIONS OF A MEMORY CARD

(75) Inventors: Bradley Scott, Mississauga (CA);
Lawrence David Forsyth, Milton (CA);
Steve Maddigan, Brampton (CA);
Dimitri Epassa, Toronto (CA)

(73) Assignee: Psion, Inc., Mississauga, Ontario (CA)

( * ) Notice: Subject to any disclaimer, the term of this patent is extended or adjusted under 35 U.S.C. 154(b) by 784 days.

(21) Appl. No.: 12/766,507

(22) Filed: Apr. 23, 2010

(65) Prior Publication Data

US 2011/0264882 A1 Oct. 27, 2011

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl.
USPC ............ 711/154; 711/163; 711/200; 711/202

(58) Field of Classification Search
None
See application file for complete search history.

(56) References Cited

U.S. PATENT DOCUMENTS

| | | | | | |
|---|---|---|---|---|---|
| 5,353,425 | A | * | 10/1994 | Malamy et al. | 711/144 |
| 5,913,213 | A | * | 6/1999 | Wikstrom et al. | 707/610 |
| 6,209,069 | B1 | * | 3/2001 | Baltar | 711/163 |
| 7,149,862 | B2 | * | 12/2006 | Tune et al. | 711/163 |
| 7,216,362 | B1 | * | 5/2007 | Strongin et al. | 726/16 |
| 7,571,270 | B1 | * | 8/2009 | Nemirovsky et al. | 710/240 |
| 7,590,880 | B1 | * | 9/2009 | Hershman | 713/502 |
| 7,953,913 | B2 | * | 5/2011 | Perry et al. | 710/200 |
| 7,953,965 | B2 | * | 5/2011 | Qin et al. | 713/1 |
| 2003/0018855 | A1 | * | 1/2003 | McWilliams et al. | 711/128 |
| 2003/0149851 | A1 | * | 8/2003 | Shiota et al. | 711/163 |
| 2004/0015864 | A1 | * | 1/2004 | Boucher | 717/124 |
| 2004/0049645 | A1 | * | 3/2004 | Lee et al. | 711/163 |
| 2008/0313452 | A1 | * | 12/2008 | Qin et al. | 713/2 |
| 2009/0070523 | A1 | * | 3/2009 | Kim et al. | 711/103 |
| 2009/0259784 | A1 | * | 10/2009 | Perry et al. | 710/108 |
| 2009/0259789 | A1 | * | 10/2009 | Kato et al. | 710/308 |
| 2010/0131694 | A1 | * | 5/2010 | Kelly et al. | 711/102 |
| 2011/0182101 | A1 | * | 7/2011 | Bae | 365/94 |

* cited by examiner

*Primary Examiner* — Edward Dudek, Jr.
*Assistant Examiner* — Matthew Chrzanowski
(74) *Attorney, Agent, or Firm* — Randi L. Karpinia; Michael J. Giannetta (57) ABSTRACT

An improved integrated circuit is provided to facilitate communication between a microprocessor and a non-volatile memory. The integrated circuit comprises at least one lock status register, at least one control register and a memory controller. The lock status register comprises a plurality of lock status bits representing whether or not a corresponding unit of storage in the volatile memory has been locked. The control register stores configurable control information for the memory controller, including sizing information defining the size of the unit of storage. The memory controller is configured to receive a modification request to modify data in the non-volatile memory; determine a target unit of storage in the non-volatile memory based on a target memory address associated with the modification request; determine from the lock status register whether the target unit of storage has been locked; and implement the modification request only if the target unit storage has not been locked. A method to be implemented by the circuit is also provided.

17 Claims, 6 Drawing Sheets

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | LOCK ENABLE | | | | | | | | | | | | UNIT SIZE | | | | | | | | | | | | | | | | | | | ADDR SIZE |
| Reset | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Bits | Access | Name | Description |
|---|---|---|---|
| 31 | R/W | lock enable | When '1' the control register is write protected, only a lock reset can clear the bit and remove the write protection. |
| 31:20 | - | - | Reserved |
| 19:16 | R/W | Unit Size | The power of 2 of this value represents the number of blocks per unit |
| 15:8 | - | - | Reserved |
| 0 | R/W | Addr Size | When '1' addressing is in 1-byte units, when '0' addressing is in 512-byte units. |

Figure 4a

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| Reset | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Bits | Access | Name | Description |
|---|---|---|---|
| 31:0 | R/W | lockx | When '1' the corresponding unit is locked, when '0' the unit is unlocked. |

Figure 4b

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| Reset | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Bits | Access | Name | Description |
|---|---|---|---|
| 31:0 | R/W | Sticky_lockx | When '1' the corresponding unit is not writeable until a lock reset occurs, when '0' the unit is unlocked. |

Figure 4c

| Bit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| Reset | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Bits | Access | Name | Description |
|---|---|---|---|
| 31:0 | R | Lock_statusx | Each bit represents the lock status of its correspondent unit, "OR'ing" between the lock and the sticky_lock bits. |

Figure 6

SYSTEM AND METHOD FOR LOCKING PORTIONS OF A MEMORY CARD

The present invention relates generally to the use of memory cards and specifically to a system and method for programmatically locking portions of a memory card when executing software from the memory card.

BACKGROUND

Some software requires the ability to restrict access to specific portions of a memory on which the software is stored to prevent malicious access thereto. For example, many handheld computers use flash memory to store software, such as an operating system and applications, necessary for execution of the handheld computer. Some operating systems require the ability to programatically lock the handheld computer's bootcode and operating system image on the flash memory prior to loading the operating system itself.

Accordingly, proprietary flash memory technology has been developed to implement such a locking mechanism. However, because of the proliferation of standard flash memory in consumer devices, the cost for standard flash memory is decreasing. Accordingly, it is desirable to use standard flash memory in handheld computers rather than the proprietary flash memory, which is usually more expensive.

SUMMARY OF THE INVENTION

Accordingly, the present invention provides a memory controller on the handheld computer that is configured to restrict access to the flash memory. Therefore, standard flash memory can be used in lieu of proprietary flash memory, reducing costs.

In accordance with one aspect of the present invention there is provided an improved memory controller configured to facilitate communication between a microprocessor and a non-volatile memory, the improvement comprising: at least one lock status register comprising a plurality of lock status bits, each of the lock status bits associated with a unit of storage in the non-volatile memory, the lock status bits representing whether or not the unit of storage in the volatile memory has been locked; at least one control register configured to store configurable control information for the memory controller, the configurable control information including sizing information defining the size of the unit of storage; and an integrated circuit configured to: receive a modification request to modify data in the non-volatile memory; determine a target unit of storage in the non-volatile memory based on a target memory address associated with the modification request; determine from the lock status register whether the target unit of storage has been locked; and implement the modification request only if the target unit storage has not been locked.

In accordance with another aspect of the invention there is provided a method for facilitating communication between a microprocessor and a non-volatile memory, the method comprising: receiving a modification request to modify data in the non-volatile memory; determining a target unit of storage in the non-volatile memory based on a target memory address associated with the modification request; determining from a lock status register whether the target unit of storage has been locked; and implementing the modification request only if the target unit storage has not been locked.

BRIEF DESCRIPTION OF THE DRAWINGS

The invention will now be described by way of example only with reference to the following drawings in which.

DETAILED DESCRIPTION OF THE PREFERRED EMBODIMENTS

Figure 1:
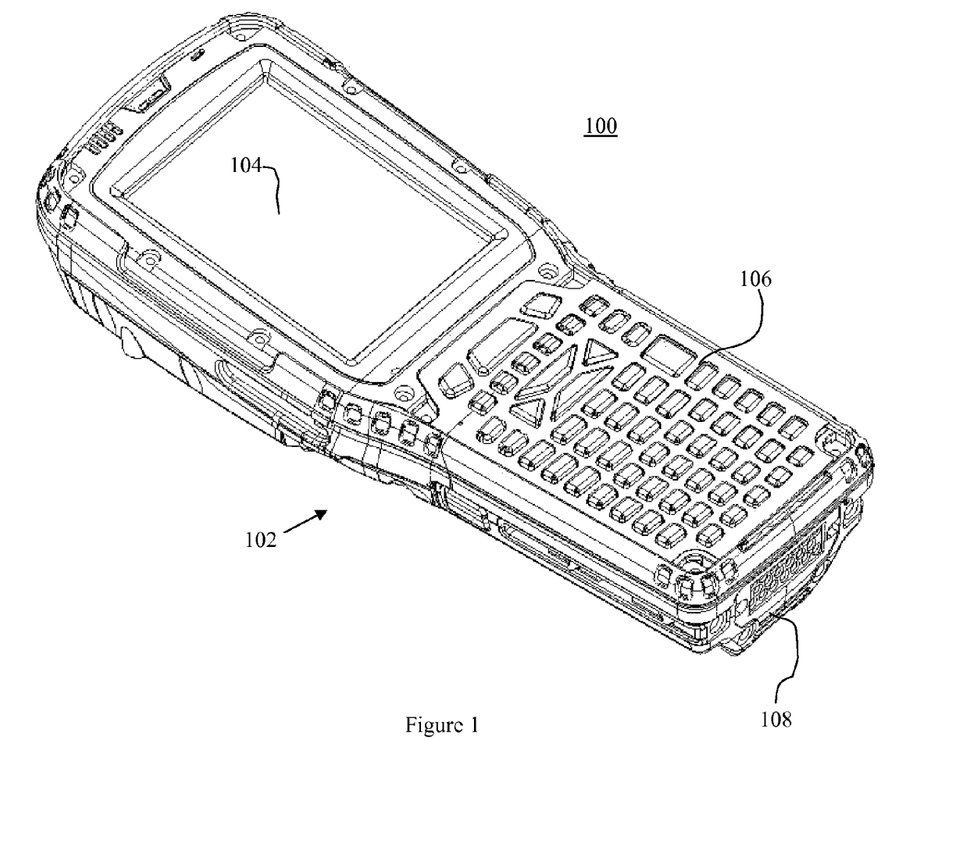
FIG. 1 is a drawing illustrating a sample mobile computer.

For convenience, like numerals in the description refer to like structures in the drawings. Referring to FIG. 1 a handheld computer (herein referred to variously and interchangeably as a mobile device, a handheld device, or a mobile computer) is shown generally by numeral 100. The handheld computer 100 comprises a main body 102, a display 104, a keyboard 106 and a battery compartment 108 for housing a rechargeable battery (not shown). Additionally, in the present embodiment, the handheld computer 100 has the capability of wireless communicating data and/or voice, to and from servers as well as data acquisition sources within a communication network.

Figure 2:
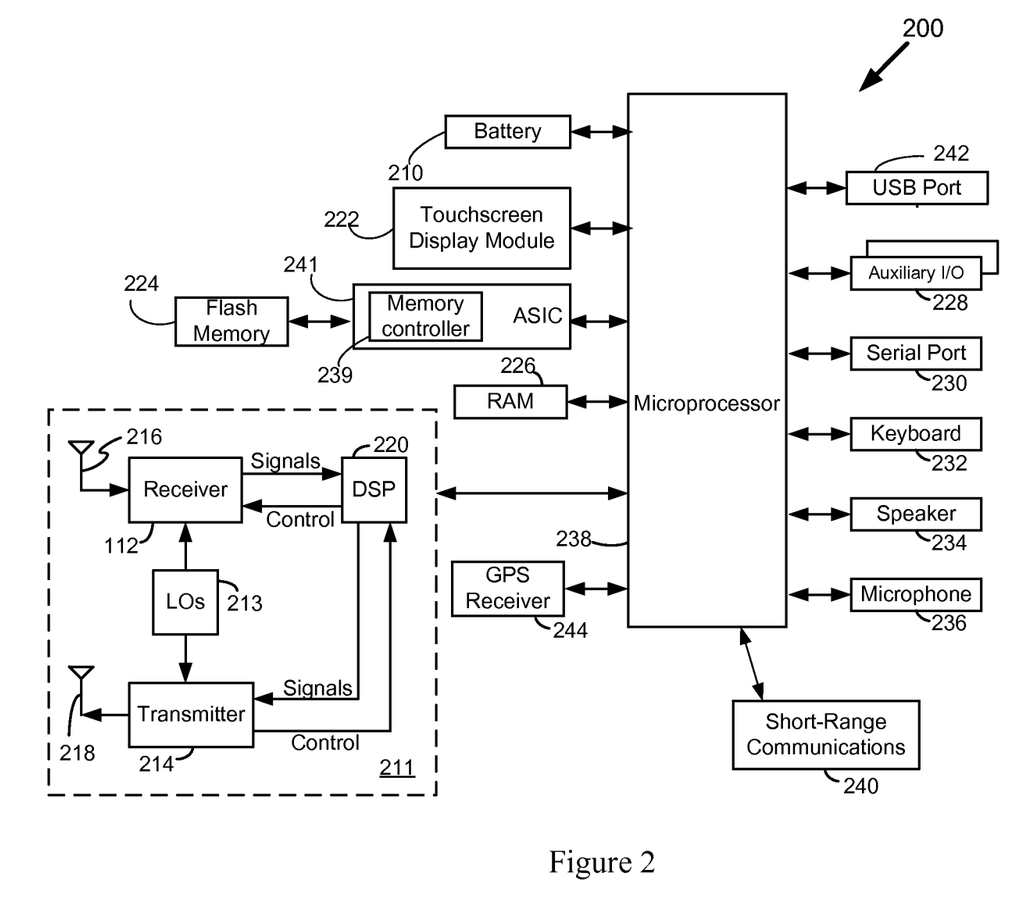
FIG. 2 is a block diagram illustrating a sample configuration of the mobile computer.

Referring to FIG. 2, a block diagram illustrating a sample configuration of the handheld computer is shown. The handheld computer 100 includes a microprocessor 238, which controls general operation of the handheld computer 100. The microprocessor 238 also interacts with functional device subsystems such as a communication subsystem 211, display module 222, a flash memory 224, random access memory (RAM) 226, auxiliary input/output (I/O) subsystems 228, serial port 230, keyboard 232, speaker 234, microphone 236, short-range communications subsystem 240 such as Bluetooth™ for example, and Universal Serial Bus (USB) expansion port 242 for peripherals. The mobile computer 100 may include a power source 210, such as a rechargeable battery which may also be removable and replaceable from the mobile computer. The mobile computer 100 may also include a positioning device 244, such as a GPS receiver for example, for receiving positioning information.

Operating system software used by the microprocessor 238 is stored in non-volatile memory such as the flash memory 224. The non-volatile memory described herein relates explicitly to generic or standard memory, such as off-the-shelf memory available to consumers. A memory controller 239, implemented on an integrated circuit, controls communication between the microprocessor 238 and the flash memory 224. The integrated circuit can be an application specific integrated circuit (ASIC), field programmable gate array (FPGA) or the like. It will be appreciated that the integrated circuit implements features in addition to the memory controller 239. These additional features are not illustrated in FIG. 2 or described herein for ease of explanation, since they do not relate to the present invention. Those skilled in the art will appreciate that the operating system, specific device applications, or parts thereof, may be temporarily loaded into a volatile store such as RAM 226.

The microprocessor 238, in addition to its operating system functions, enables execution of software applications on the mobile computer 100. A predetermined set of applications, which control basic device operations, may be installed on the mobile computer 100 during its manufacture. These basic operations typically include data and voice communication applications, for example. Additionally, applications may also be subsequently loaded onto the handheld device 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of the handheld device 100 and may provide enhanced on-device features, communication-related features, or both.

The radio frequency (RF) communication subsystem 211, includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the RF communication subsystem 211 depends on the communication network in which mobile computer 100 is intended to operate, but may include communication functionalities such as radio-frequency identification (RFID), Wi-Fi WLAN based on 802.11 standards, and the like.

The display module 222 is used to visually present an application's graphical user interface (GUI) to the user. Depending on the type of mobile computer 100, the user may have access to various types of input devices, such as, for example, a scroll wheel, trackball, light pen and/or a touch sensitive screen.

For convenience, in the present embodiment the memory controller 239 is configured to implement requirements for a particular implementation. However, as will become apparent, the memory controller 239 can be configured for a variety of different implementations.

In the present embodiment, the flash memory 224 is Secure Digital (SD) or Secure Digital High Capacity (SDHC) memory and the memory controller 239 is a SD controller. The SD controller is a revised version of the Faraday FTSDC010 SDIO controller that includes support of memory locking. The memory controller 239 prevents erase and write commands from being executed into a programmed locked region of the flash memory 224, and protects from re-programming its size.

In the present embodiment, the memory controller 239 is configured to be able to programmatically lock the first 512 MB of the flash memory 224 with 8 MB granularity. That is, the first 512 MB of the flash memory 224 can be locked in 8 MB units. The memory controller 239 is further configured to assign three possible states to each unit: locked; unlocked; and sticky-locked. Unit states can be switched freely from unlocked to locked, locked to unlocked, locked to sticky-locked and unlocked to sticky-locked states. However, units that are in the sticky-locked state cannot have their states switched without at least a warm reset of the handheld computer 100.

Figure 3:
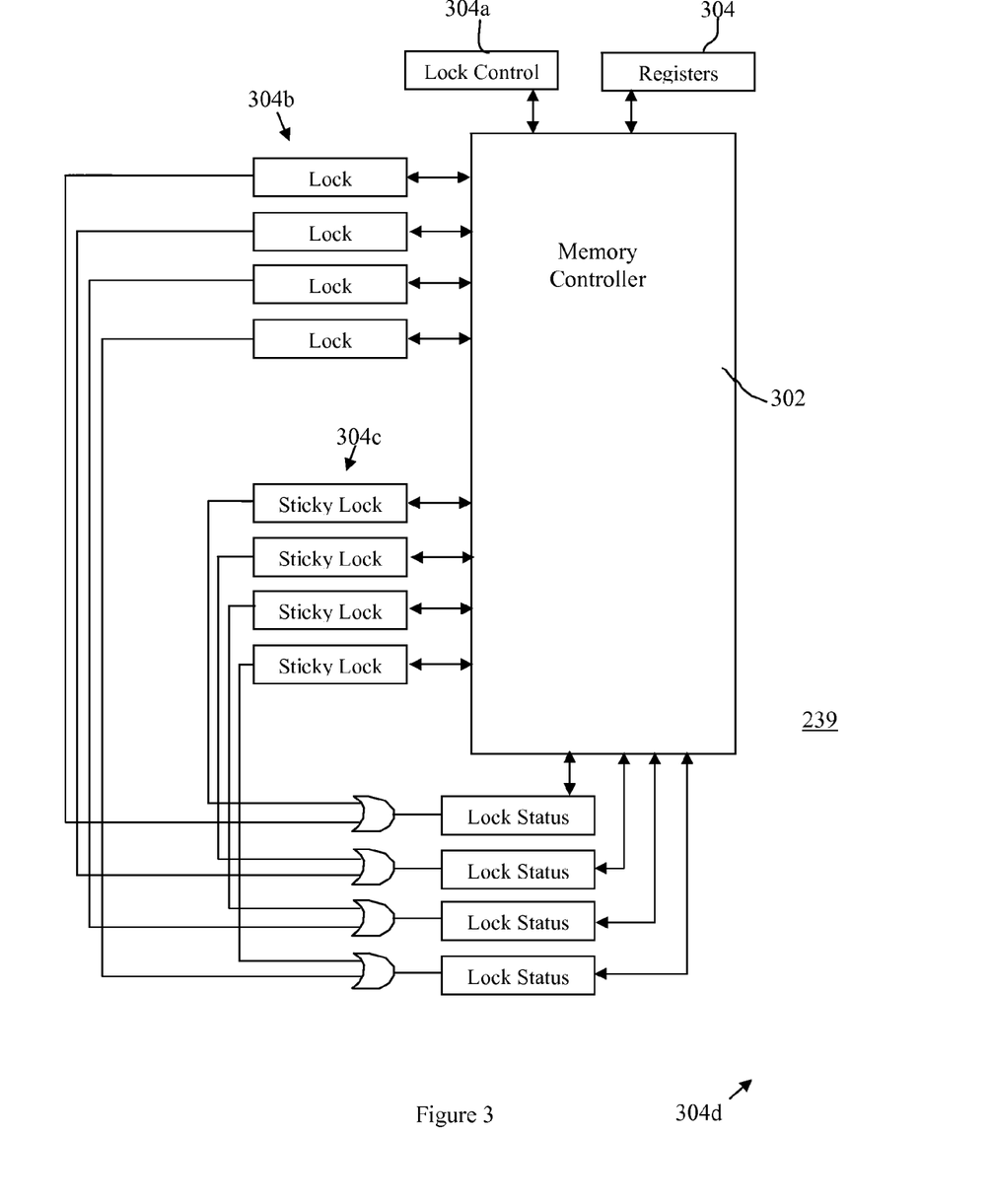
FIG. 3 is a block diagram of a memory controller.

Referring to FIG. 3, a block diagram of the memory controller 239 is shown. As illustrated, the memory controller 239 comprises a controller 302 and a plurality of registers 304. The registers 304 include shift registers as well as storage registers. In order to facilitate locking or restricting access to the flash memory 224, thirteen additional 32-bit registers are provided. These registers include a lock control register 304a, four lock registers 304b, four sticky-lock registers 304c, and four lock status registers 304d.

Figure 4A:
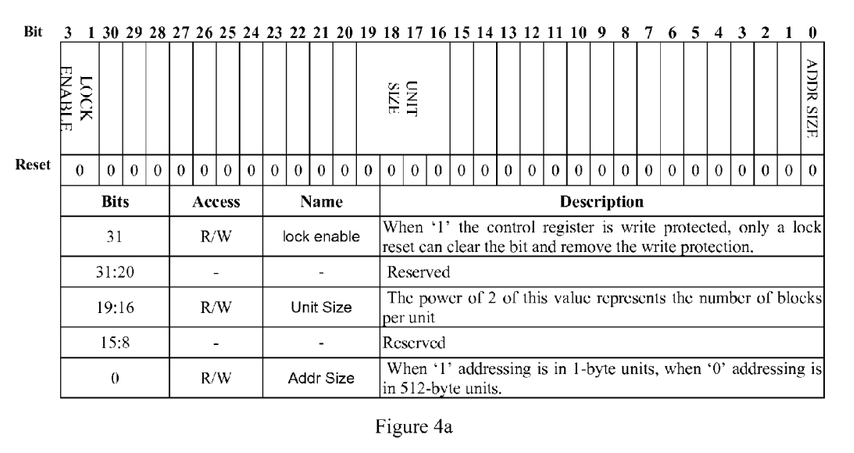
FIGS. 4a to 4d are block diagrams illustrating bit allocation in a lock control register, lock registers, sticky-lock registers, and lock status registers.

Referring to FIG. 4a, a block diagram illustrating bit-allocation in the lock control register 304a is illustrated. In the present embodiment, the offset for the lock control register 304a is 0x100. Each of the 32 bits in the register is labelled 0 to 31. Bit 31 is a lock enable bit. When the lock enable bit is set to '1' the lock control register 304a is write-protected. Only a microprocessor reset can clear the bit and remove the write protection.

Bits 30 to 20 and 15 to 1 are reserved for potential future use.

Bits 16 to 19 represent the unit size. The unit size, as used in this description, refers to a unit size of memory to be locked. The power of two of the unit size (that is $2^{unit\_size}$) represents the number of blocks per unit.

Bit 0 is an address size bit. When the address size bit is set to '1' addressing is in 1-byte sections. When the address size bit is set to '0' addressing is in 512-byte sections.

The address size bit is used to provide support for both SD and SDHC flash memory. Specifically, SD addressing is performed using an addressing section size of 1 byte. In contrast, SDHC addressing is performed using an addressing section size of 512 bytes.

Figure 4B:
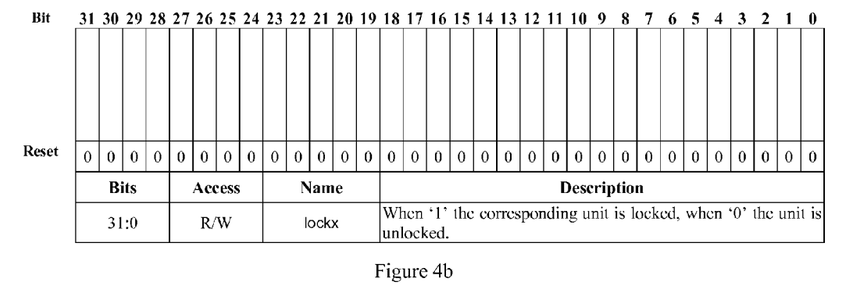

Referring to FIG. 4b, a block diagram illustrating bit-allocation in a first one of the four lock registers 304b is shown. Each of the 32 bits in the register is labelled 0 to 31. Each bit represents a unit. When a bit is set to '1' the corresponding unit is locked. When a bit is set to '0' the corresponding unit is not locked. In each of the remaining three lock registers 304b, the 32 bits are labelled 32 to 63, 64 to 95, and 96 to 127, respectively. The offset for each of the lock registers 304b is 0x140, 0x144, 0x148 and 0x14C, respectively. The four lock registers 304b may also be referred to individually as LOCK_0, LOCK_1, LOCK_2 and LOCK_3 or as LOCK_x, where x is 0, 1, 2, or 3.

Figure 4C:
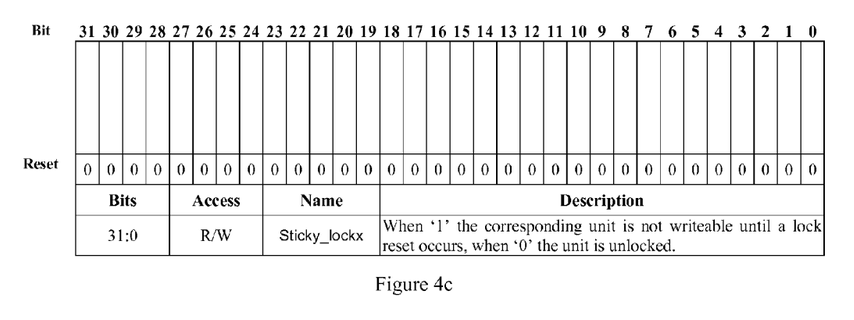

Referring to FIG. 4c, a block diagram illustrating bit-allocation in a first one of the four sticky-lock registers 304c is shown. Each of the 32 bits in the register is labelled 0 to 31. Each bit represents a unit. When a bit is set to '1' the corresponding unit is sticky-locked. When a bit is set to '0' the corresponding unit is not sticky-locked. In each of the remaining three sticky-lock registers 304c, the 32 bits are labelled 32 to 63, 64 to 95, and 96 to 127, respectively. The offset for each of the sticky lock registers 304c is 0x180, 0x184, 0x188 and 0x18C, respectively. The four sticky-lock registers 304c may also be referred to individually as STICKY_LOCK_0, STICKY_LOCK_1, STICKY_LOCK_2 and STICKY_LOCK_3 or as STICKY_LOCK_x, where x is 0, 1, 2, or 3.

Figure 4D:
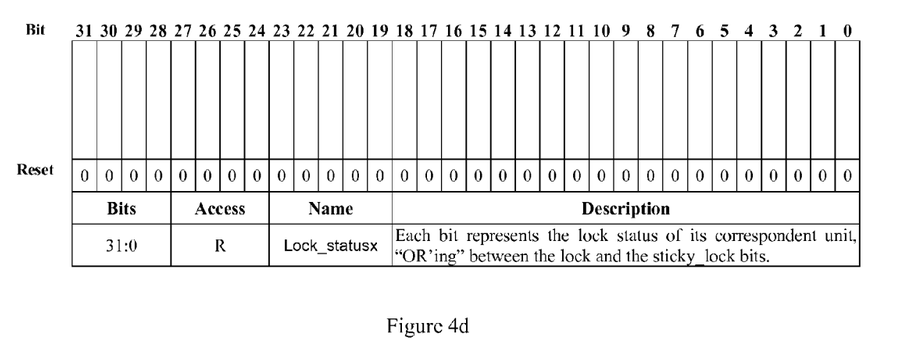

Referring to FIG. 4d, a block diagram illustrating bit-allocation in a first one of the four lock status registers 304d is shown. Each of the 32 bits in the register is labelled 0 to 31. Each bit represents the lock status of a correspondent unit. The lock status is determined by performing a logical OR between the corresponding bit of the lock register 304a and the sticky-lock register 304b. When a bit is set to '1' the corresponding unit is either locked or sticky-locked. When a bit is set to '0' the corresponding unit is unlocked. In each of the remaining three lock status registers 304d, the 32 bits are labelled 32 to 63, 64 to 95, and 96 to 127, respectively. The offset for each of the lock status registers 304d is 0x1C0, x1C4, 0x1C8 and 0x1CC, respectively. The four lock registers 304b may also be referred to individually as LOCK_STATUS_0, LOCK_STATUS_1, LOCK_STATUS_2 and LOCK_STATUS_3 or as LOCK_STATUS_x, where x is 0, 1, 2, or 3.

Accordingly, a summary of the registers described above is provided in Table 1 below:

TABLE 1

| Name | Offset | Type | Reset value | Description |
| --- | --- | --- | --- | --- |
| LOCK_CONTROL | 0x100 | R/W | 0x00000000 | Lock mechanism control register |
| LOCK_0 | 0x140 | R/W | 0x00000000 | Lock control bit for units 0 to 31 |
| LOCK_1 | 0x144 | R/W | 0x00000000 | Lock control bit for units 32 to 63 |
| LOCK_2 | 0x148 | R/W | 0x00000000 | Lock control bit for units 64 to 95 |
| LOCK_3 | 0x14C | R/W | 0x00000000 | Lock control bit for units 96 to 127 |
| STICKY_LOCK_0 | 0x180 | R/W | 0x00000000 | Sticky lock control bit for units 0 to 31 |
| STICKY_LOCK_1 | 0x184 | R/W | 0x00000000 | Sticky lock control bit for units 32 to 63 |
| STICKY_LOCK_2 | 0x188 | R/W | 0x00000000 | Sticky lock control bit for units 64 to 95 |
| STICKY_LOCK_3 | 0x18C | R/W | 0x00000000 | Sticky lock control bit for units 96 to 127 |
| LOCK_STATUS_0 | 0x1C0 | R | 0x00000000 | Lock bit status for units 0 to 31 |
| LOCK_STATUS_1 | 0x1C4 | R | 0x00000000 | Lock bit status for units 32 to 63 |
| LOCK_STATUS_2 | 0x1C8 | R | 0x00000000 | Lock bit status for units 64 to 95 |
| LOCK_STATUS_3 | 0x1CC | R | 0x00000000 | Lock bit status for units 96 to 127 |

Accordingly, it will be appreciated that the present implementation of the memory locking mechanism is able to lock sectors of size up to 2 GB. That is, the four 32-bit registers provide 128 (4*32) individually lockable units. As previously described, the number of blocks per unit is $2^{unit\_size}$ and the unit size is four bits wide. Thus, the maximum unit size is 15 and the maximum number of blocks per unit in the present implementation is 32,768 ($2^{15}$). Each block is 512 bytes. Therefore, each maximum unit size is 16,731,136 or 16 MB. 128 lockable units at 16 MB each is 2 GB.

However, in the present embodiment, it is desirable to provide 8 MB of resolution rather than 16 MB. Accordingly, the unit size is set to 14 and the number of blocks per unit is 16,384 ($2^{14}$). Since each block is 512 bytes, each lockable unit is 8 MB. As will be described, instructions provided in a bootcode on the handheld computer 100 will determine which of the units to lock. In general, the bootcode will sticky-lock a boot region and an operating system image region, leaving the rest of the flash memory 224 unlocked to allow data files to be stored thereon. The boot region is typically 1 unit and the operating system image region is variable, depending on the size requirements of the operating system image. For example, WinCE has an operating system image of region of 32 MB while Windows Mobile can have an operating system image of region of 64 MB or greater.

Figure 5:
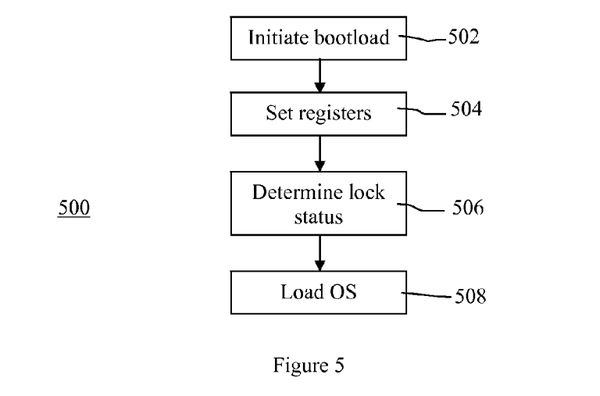
FIG. 5 is a flow chart illustrating the steps for setting the register bits.

Referring to FIG. 5, a flow chart illustrating a method for setting the registers 304 is illustrated generally by numeral 500. The lock control register 304a, four lock registers 304b and four sticky-lock registers 304c are set by the microprocessor 238 when bootloading the handheld computer 100. As is well known in the art, bootloading refers to the bootcode executed by a bootloader upon startup of a computing device.

Accordingly, at step 502, the bootloading process is initiated. The bootloading process may be initiated in response to either a cold or warm reboot, also referred to as a hard or soft reboot.

At step 504 the bootloader sets the registers. The control register is set and locked and the lock registers 305b and/or the sticky-lock registers 305c are set. In the present embodiment, an initial bootloader sets and write protects the lock control register 304, thereby selecting the unit size. A secondary bootloader sets the sticky-lock registers to lock the boot region and operating system image region just before running the main operating system.

At step 506, a bitwise logical OR is performed on each LOCK_x register with the corresponding STICKY_LOCK_x register to generate the LOCK_STATUS_x value. In the present embodiment, the bitwise logical OR is performed in hardware. Accordingly, once either a bit in the lock register 304b or a bit in the sticky-lock register 303c changes, that change propagates through to the corresponding bit in the lock status register 304d.

At step 508, once the lock registers 304b and sticky lock registers 304c have been set by the secondary bootloader, the secondary bootloader loads and runs the operating system.

Once the lock is configured, any attempts to write or erase one or more blocks within the locked sectors will be ignored by the memory controller 239. Since the attempts to write to the flash memory 224 will not be received by the flash memory 224, they will not be acknowledged by the flash memory 224. This will cause a response timeout error and set a response timeout bit. To properly recover from the timeout response error and proceed with another data transfer, the response timeout bit should be cleared before issuing the next command.

Figure 6:
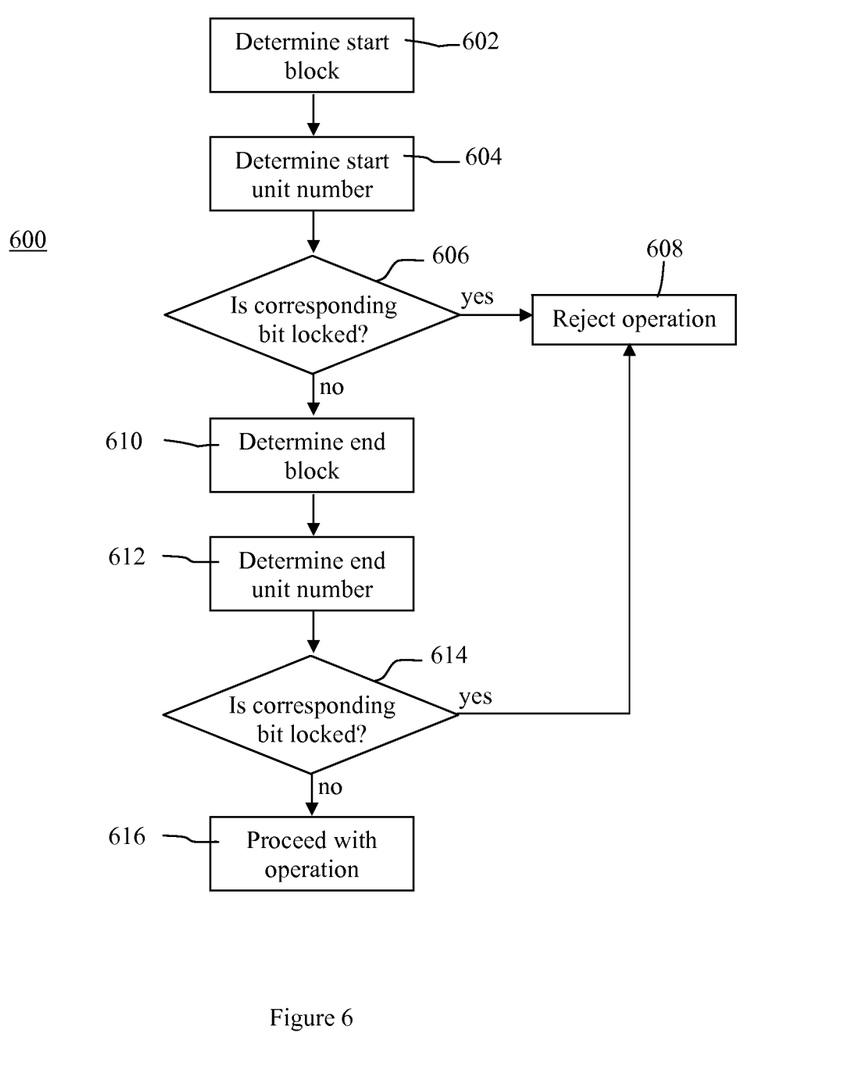
FIG. 6 is a flow chart illustrating the steps for determining whether or not a target unit is locked.

Referring to FIG. 6, a flow chart illustrating steps implemented by the memory controller 239 upon receipt of a write or write-multiple operation is shown generally by numeral 600. In the present embodiment, the write and write-multiple operations are limited to writing data at no more than one unit size at a time. As will become apparent, this limitation ensures that an ending unit of the write operation will never be more than one unit away from the starting unit such that checking the lock status of both the starting unit and the ending unit will be sufficient. That is, there will be no way to have a locked unit between an unlocked starting unit and unlocked ending unit.

At step 602, the start block of the write operation is determined. In the present embodiment, the start block is determined by looking at an argument value from the write operation. In the present embodiment, the argument value is a target memory address for the write operation. The start block is determined by multiplying the argument value by the number of bytes per addressing section, then dividing the result by the block size of 512 bytes. As described with reference to the lock control register 304a, in the present embodiment, if the address size bit is not set, the number of bytes per addressing section is 512 bytes. If the address size bit is set, the number of bytes per addressing section is 1 byte. Thus, if the address size bit is set the start block is determined by right-shifting the argument value by 9 bits, effectively dividing it by 512. If the address size bit is not set, the start block is determined to be the argument value.

At step 604, a start unit number corresponding to the start block is determined as follows. Effectively, the start unit number is the start block divided by the number of blocks per unit. Thus, the start unit number is determined by right shifting the start block number by the number of bits indicated by unit size defined in the lock control register 304a. Because the present embodiment is implemented using four 32-bit registers, bits [6:5] of the start unit number identify which of the lock status registers to check, and bits [4:0] identify which bit within the register to check. If one 128-bit register were used instead of four 32-bit registers, bits [6:0] would identify which bit within the register is the start unit number.

At step 606, the unit number's corresponding lock status bit is checked to determine if it is a '1' or a '0'. If the corresponding lock status bit is a '1' then the method continues to step 608 and the write operation is rejected. If the corresponding lock status bit is a '0' then the method continues to step 610.

At step 610, an end block of the operation is determined as follows. The length of the data to be written, data_length, is right shifted by 9 bits to determine the data length in blocks. The end block can be calculated by adding the start block to the data length in blocks and subtracting one.

At step 612, an end unit number corresponding to the end block is determined as follows. Similarly to the start unit number, the end unit number is the end block divided by the number of blocks per unit. Thus, the end unit number is determined by right shifting the end block number by the number of bits indicated by unit size defined in the lock control register 304a. Because the present embodiment is implemented using four 32-bit registers, bits [6:5] of the end unit number identify which of the lock status registers to check, and bits [4:0] identify which bit within the register to check. If one 128-bit register were used instead of four 32-bit registers, bits [6:0] would identify which bit within the register is the end unit number.

At step 614, the unit number's corresponding lock status bit is checked to determine if it is a '1' or a '0'. If the corresponding lock status bit is a '1' then the method continues to step 608 and the write operation is rejected. If the corresponding lock status bit is a '0' then the method continues to step 616 and the write operation proceeds as normal.

In the present embodiment, any unit number that exceeds the number of implemented lock status bits is considered to be unlocked and the write operation can continue as normal.

Although the method is described above with specific reference to the write and write multiple operations, it can also be applied to other operations that attempt to modify data, such as an erase operation for example.

Accordingly, it will be appreciated by a person of ordinary skill in the art that the block locking mechanism described above prevents data-modifying commands from being executed in a programmed locked region of the memory card.

However, although the invention is described with reference to a specific embodiment, modifications to the embodiment will become apparent to a person of ordinary skill in the art.

For example, the method described with reference to FIG. 6 describes determining a start unit number and an end unit number. However, if the locked units must be sequential and start with the initial unit then, there is no chance that an end block will be locked if the start block is unlocked. Accordingly, there may be no need to determine the end unit number, but rather the start unit number alone may be sufficient.

Also, although the present embodiment is described with specific reference to SD and SDHC flash memory, the memory controller 239 can be configured for other types of flash memory and, potentially, non-flash memory.

Therefore, although the invention has been described with reference to certain specific embodiments, various modifications thereof will be apparent to those skilled in the art without departing from the scope of the invention as defined by the appended claims.

What is claimed is:

1. An improved integrated circuit configured to facilitate communication between a microprocessor and a non-volatile memory, the improvement comprising:
    a lock register comprising a plurality of lock bits, each of the lock bits associated with a unit of storage in the non-volatile memory, the lock bits representing whether or not the unit of storage in the non-volatile memory has been locked, a state of the lock bits capable of being modified;
    a sticky-lock register comprising a plurality of sticky-lock bits, each of the sticky-lock bits associated with a unit of storage in the non-volatile memory, the sticky-lock bits representing whether or not the unit of storage in the non-volatile memory has been sticky-locked, a state of the sticky-lock bits capable of being modified only upon a reboot;
    a lock status register comprising a plurality of lock status bits, each of the lock status bits associated with a unit of storage in the non-volatile memory, the lock status bits representing whether or not the unit of storage in the non-volatile memory has been locked, wherein the lock status bits of the lock status register are set by logically ORing the sticky-lock bits of the sticky-lock register with corresponding lock bits of the lock register;
    a control register configured to store configurable control information, the configurable control information including sizing information defining a size of the unit of storage; and
    a memory controller receiving the configurable control information and configured to:
        receive a modification request to modify data in the non-volatile memory;
        determine a target unit of storage in the non-volatile memory based on a target memory address associated with the modification request;
        determine from one of the lock register, the sticky-lock register, and the lock status register whether the target unit of storage has been locked; and
        implement the modification request only if the target unit storage has not been locked.

2. The integrated circuit of claim 1, wherein the integrated circuit is one of an application-specific integrated circuit (ASIC) and a field-programmable gate array (FPGA).

3. The integrated circuit of claim 2, wherein the memory controller is configured to implement modification requests to data no greater than one unit of storage per request.

4. The integrated circuit of claim 2, wherein the configurable control information further includes addressing information representing a number of bytes per addressing section.

5. The integrated circuit of claim 4, wherein the memory controller is configured to determine the target unit of storage using one or more shift registers operable to: divide the target memory address by the number of bytes per addressing section to determine a start block;
    and divide the start block by the size of the unit of storage to determine the target unit of storage.

6. The integrated circuit of claim 5, wherein the target unit of storage identifies a corresponding lock status bit.

7. The integrated circuit of claim 5 including four 32-bit lock status registers, four 32-bit lock registers, and four 32-bit sticky-lock registers, and the target unit of storage identifies a corresponding lock status register and lock status bit.

8. The integrated circuit of claim 2, including four 32-bit lock status registers, four 32-bit lock registers, and four 32-bit sticky-lock registers.

9. The integrated circuit of claim 1, wherein the modification request is one of a write operation, a write-multiple operation and an erase operation.

10. A method for facilitating communication between a microprocessor and a non-volatile memory, the method comprising:
- receiving a modification request to modify data in the non-volatile memory;
- accessing configurable control information, the configurable control information including at least one of addressing information representing a number of bytes per addressing section and sizing information defining a size of a unit of storage;
- determining a start target unit of storage in the non-volatile memory based on a target memory address associated with the modification request by multiplying the target memory address by the number of bytes per addressing section to determine a byte number, dividing the byte number by a number of bytes per block to determine a start block, and dividing the start block by the size of the unit of storage to determine the start target unit of storage;
- determining from a lock status register whether the start target unit of storage has been locked; and
- implementing the modification request only if the start target unit of storage has not been locked.

11. The method of claim 10, wherein the start target unit of storage identifies a corresponding lock status bit.

12. The method of claim 10, wherein the start target unit of storage identifies a corresponding lock status register and lock status bit.

13. The method of claim 10, wherein the modification request is one of a write operation, a write-multiple operation and an erase operation.

14. The method of claim 10, further comprising:
- determining a plurality of subsequent target units of storage in the non-volatile memory based on a target memory address and a data length associated with the modification request;
- determining from a lock status register whether the subsequent target units of storage have been locked; and
- implementing the modification request only if the start target unit of storage and all of the subsequent target units of storage have not been locked.

15. The method of claim 10, wherein the modification request is restricted to a maximum length of one unit in size.

16. The method of claim 15, further comprising:
- determining an end target unit of storage in the non-volatile memory based on a target memory address and a data length associated with the modification request;
- determining from a lock status register whether the end target unit of storage has been locked; and
- implementing the modification request only if both the start target unit of storage and the end target unit of storage have not been locked.

17. The method of claim 16, wherein determining the end target unit of storage comprises:
- dividing a length of the data to be written by a number of bytes per block to determine a data length in blocks;
- adding the data length in blocks to a start block and subtract one to determine an end block; and
- dividing the end block by the size of the unit of storage to determine the end target unit of storage.

* * * * *